Aug. 5, 1924.

A. O. HUBBARD 1,503,832

TRICYCLE

Filed May 7, 1923

Inventor
ARTHUR O. HUBBARD

By Paul, Paul & Moore
ATTORNEYS

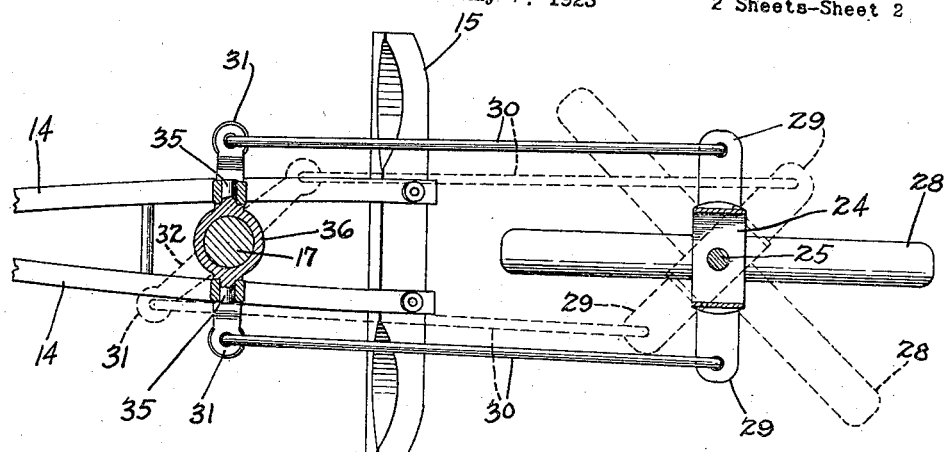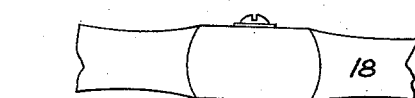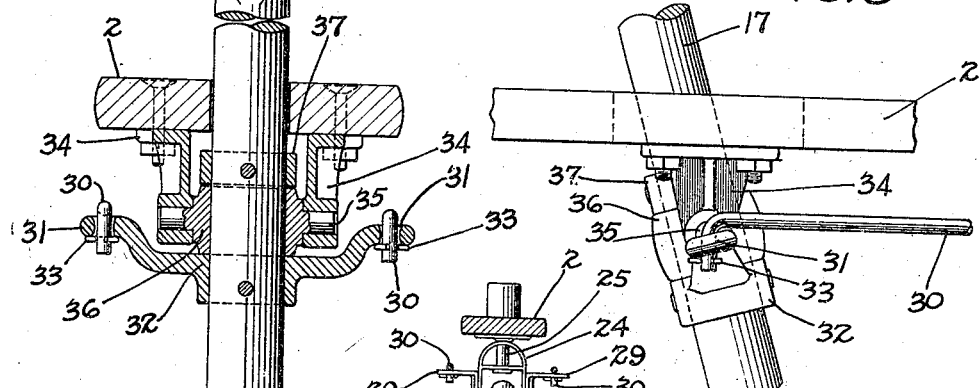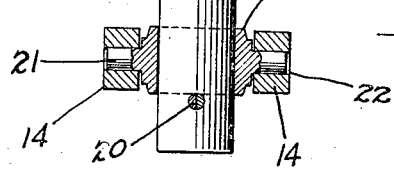

Patented Aug. 5, 1924.

1,503,832

UNITED STATES PATENT OFFICE.

ARTHUR O. HUBBARD, OF MINNEAPOLIS, MINNESOTA.

TRICYCLE.

Application filed May 7, 1923. Serial No. 637,262.

*To all whom it may concern:*

Be it known that I, ARTHUR O. HUBBARD, a citizen of the United States, resident of Minneapolis, county of Hennepin, and State of Minnesota, have invented certain new and useful Improvements in Tricycles, of which the following is a specification.

The object of my invention is to provide a child's tricycle in which the hands of the rider can be used for both propelling and steering the machine instead of turning the front wheel with the feet as usual in machines of this type, thus giving the rider better control of the machine and making its operation easier and more positive.

A further object is to provide a tricycle in which the full power of the feet and legs can be used for propelling purposes.

A further object is to provide a tricycle in which there is no loss of power in steering the machine and it may be steered moving backward as well as forward.

A further object is to provide a machine of the class described that is adapted for the development of all the muscles of the body; its operation being closely related to a rowing machine, the muscles of the arms, back and legs are called into play in substantially the same manner as in a rowing machine or boat.

Other objects of the invention will appear from the following detailed description.

The invention consists generally in various constructions and combinations all as hereinafter described and particularly pointed out in the claims.

In the accompanying drawings forming part of this specification,

Figure 3 is a horizontal sectional view taken on the plane of the line 3—3 in Figure 1 and showing the connections between the steering wheel and the steering post or lever;

Figure 4 is a sectional view on the line 4—4 of Figure 2;

Figure 5 is a detail view showing the connecting means between the steering post and the steering wheel;

Figure 6 is a sectional view on the line 6—6 of Figure 1.

Figure 1:
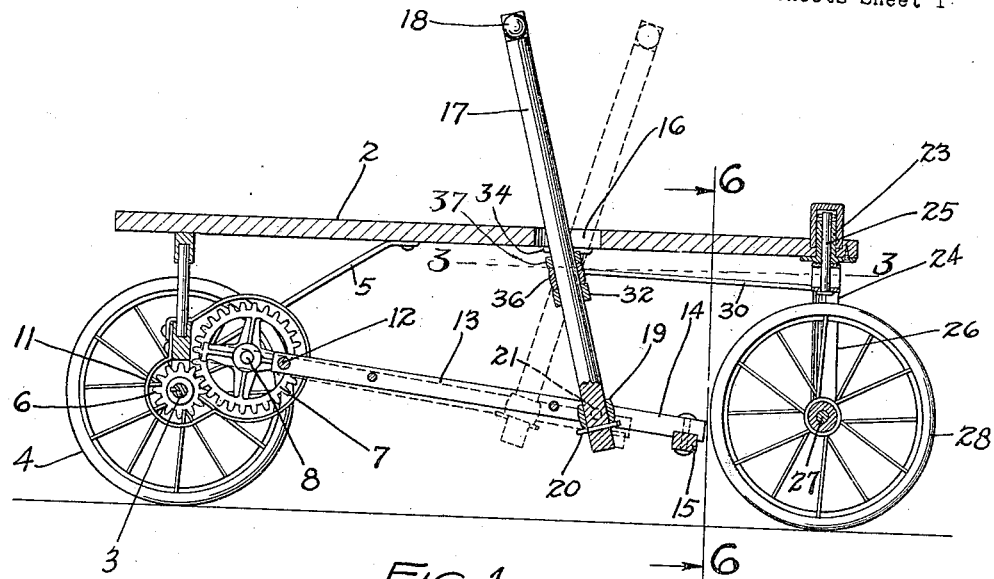
Figure 1 is a longitudinal sectional view through a tricycle embodying my invention.
Figure 2:
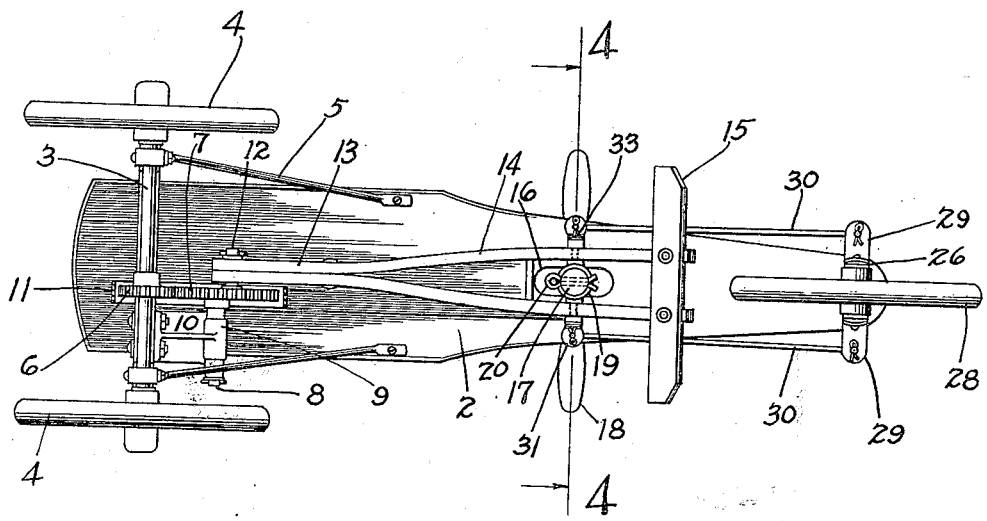
Figure 2 is a plan view looking at the under side of the machine.

In the drawing: numeral 2 designates the platform of the machine made preferably of wood and having a rear axle 3 and supporting wheels 4. Braces 5 connect the axle with the under side of the platform 2. A pinion 6 is secured on said axle and meshes with a comparatively large gear 7 that is mounted on a shaft 8 journaled in bearings 9 provided in a bracket 10 mounted on a sleeve on the axle 3 beneath the platform 2. A suitable housing 11 encloses the pinion and gear.

The gear 7 has a crank-pin 12 thereon, and a pitman 13 is pivoted at one end on said crank-pin and has a forked forward portion with arms 14 on the forward ends of which a foot-piece 15 is secured and projects outwardly on each side and is adapted to receive the feet of the rider for propelling the machine.

The platform has a slot 16 therein and a combination steering and operating lever or post 17 depends through said slot and has a hand-grip 18 at its upper end, and at its lower end is provided with a loosely mounted collar 19 held in place on the lever by a pin 20; said collar having gudgeons 21 thereon fitting within bearings 22 in the arms 14.

At the forward end of the platform, a bearing 23 is provided, and a wheel fork 24 has a pin 25 in the form of a king-bolt passing through the upper portion of the fork and into said bearing, said fork having depending parallel arms 26 in the lower ends of which the axle 27 of the forward steering wheel 28 is mounted.

The arms 26 are provided with brackets 29 as shown in Figure 6 having holes therein to receive the downwardly turned forward ends of rods 30, the corresponding rear ends of these rods fitting loosely within eyes 31 formed in the ends of yoke 32 that is secured to the post 17. Keys 33 are provided in the ends of the rods to prevent accidental disengagement thereof from the eyes, but allowing their convenient separation whenever desired. When the steering lever or post is rotated on a vertical axis, the wheel 28 will be correspondingly oscillated by the front fork 26 turning on the king-pin 25 to steer the machine. The under side of the platform 2 has brackets 34 secured thereto in which gudgeons 35 on a hub 36 have bearings; said hub being loosely mounted on the lever 17 between the yoke 32 and a collar 37 that is secured to said lever above the hub 36. The lever is therefore free to rotate in the hub for the purpose of oscillating the forward wheel, or the lever may be oscillated forward and backward on the bearings 35 in propelling the machine. It has therefore, a compound or combination movement; one on a horizontal axis to aid the feet of the rider in propelling the machine, and the other on a vertical axis to steer the machine independently of the action of the feet. Generally in machines of this type, the propelling power is applied to the rear axle by the movement or oscillation of the upright lever, the rider having foot-rests on or adjacent the axle of the forward wheel by means of which the wheel may be turned on its vertical axis to steer the machine.

In my improved machine, the full power of the rider's feet and legs can be applied directly to the pitman and the gear mechanism to propel the machine, the feet not being used for steering, and at the same time, the rider grasping the lever with the hands can aid in the machine propulsion and steer the machine. I thus am able to have a more positive and reliable control of the steering wheel and greater power for application to the machine-propelling mechanism.

It will be understood that this machine can be steered while running backward in the same manner as running forward, the lever being oscillated on its vertical axis in the same manner while the rider's feet will apply the power at another point in the stroke of the pitman.

I claim as my invention:

1. A child's vehicle comprising a frame having rear driving wheels and a forward steering wheel, a lever mounted to oscillate on a horizontal axis in said frame and operatively connected through a foot-operated lever pivoted thereon with said rear wheels, said first mentioned lever being also mounted to rotate on its longitudinal axis, and means connecting said lever with said forward wheel for oscillating it to steer the machine.

2. A child's vehicle comprising a platform having a rear axle and driving wheels and a forward steering wheel, a pitman having its rear end connected to said axle by gears and provided with foot-rests at its forward end for the application of foot power thereto, a lever mounted to oscillate in horizontal bearings on said platform and connected with said pitman for forward and backward movement therewith, said lever being mounted to rotate on its longitudinal axis, and means connecting it with said forward wheel for oscillating said wheel to steer the vehicle.

3. A child's vehicle comprising a platform, driving wheels and steering means, a lever mounted to rotate on its longitudinal axis to operate the steering means, a second lever connected at one end to the driving wheels and pivoted on the first lever, said second lever having thereon a foot rest operative to drive the drive wheels.

4. A child's vehicle comprising a platform, driving wheels and steering means, a lever pivoted between its ends and mounted to rotate on a longitudinal axis to steer the vehicle when said lever is rotated and foot operative means operatively connecting the lower portion of said lever with said driving wheels to aid in propelling the vehicle.

5. In a child's vehicle, the combination with a platform having driving and steering wheels, of an upright lever having hand-grips thereon and extending above and below said platform, a hub loosely mounted on said lever and having horizontal bearings supported by said platform, a yoke secured to said lever below said hub, a fork mounted on the forward portion of said platform to oscillate on a vertical axis and wherein said forward wheel is mounted, and rods loosely connecting said yoke with said fork whereby oscillation of said lever on a longitudinal axis will turn said forward wheel to steer the machine.

6. The combination with a platform having rear driving wheels and a forward steering wheel, of a lever mounted to rock in bearings supported by said platform and projecting above and below said platform, a pitman having a driving connection with said rear wheels, a collar loosely mounted on the lower portion of said lever and having horizontal bearings in said pitman, said collar permitting forward and backward oscillation of said lever and rotation thereof on a longitudinal axis, said pitman having foot-rests for applying foot power thereto, and the upper portion of said lever having handgrips for applying hand power thereto to augment said foot power, said lever having a rotary movement on a longitudinal axis, and means connecting it with said forward wheel for turning it to steer the machine.

7. A child's vehicle having rear traction means and a forward steering means, a lever mounted to oscillate on a transverse axis and on its longitudinal axis, foot operative propelling means connecting said lever with said traction means, and means connecting said lever with said steering means.

8. In a child's vehicle, a lever mounted to oscillate on both the transverse and a longitudinal axis, and propelling mechanism including a foot operative lever and steering mechanism, both mechanisms connected with said first mentioned lever and operative respectively by its oscillating movements to propel and steer the vehicle.

9. In a child's vehicle, a lever mounted to oscillate on a transverse axis and rotate on a longitudinal axis, and propelling and steering mechanisms connected with said lever to be operated respectively by its oscillating and rotary movement, the connection of said lever with said propelling means being adapted for applying foot power of the rider thereto.

In witness whereof, I have hereunto set my hand this 4th day of May, 1923.

ARTHUR O. HUBBARD.